United States Patent
Lee et al.

(10) Patent No.: US 7,280,458 B2
(45) Date of Patent: Oct. 9, 2007

(54) OPTICAL PICKUP APPARATUS AND OPTIMAL LIGHT SPOT FOCUSING METHOD

(75) Inventors: Yong-jae Lee, Gyeonggi-do (KR);
Sung-ro Go, Gyeonggi-do (KR);
Pyong-yong Seong, Seoul (KR);
Chang-jin Yang, Gyeonggi-do (KR);
Gi-bong Song, Gyeonggi-do (KR);
Byung-in Ma, Gyeonggi-do (KR);
Jong-koog Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 593 days.

(21) Appl. No.: 10/120,786

(22) Filed: Apr. 12, 2002

(65) Prior Publication Data

US 2002/0159378 A1 Oct. 31, 2002

(30) Foreign Application Priority Data

Apr. 12, 2001 (KR) .............................. 2001-19647

(51) Int. Cl.
*G11B 7/95* (2006.01)
(52) U.S. Cl. .............................. 369/112.12; 369/44.23; 369/44.37
(58) Field of Classification Search ............. 369/44.23, 369/44.1, 44.29, 94, 120, 112.12, 112.11, 369/112.04, 112.26, 112.07, 44.37, 44.41, 369/53.2, 44.24, 112.23, 44.21, 44.11, 112.01, 369/53.22

See application file for complete search history.

(56) References Cited

U.S. PATENT DOCUMENTS

| | | | | |
|---|---|---|---|---|
| 4,983,017 A * | 1/1991 | Tsuji et al. | ............ | 369/112.12 |
| 5,511,059 A * | 4/1996 | Brazas, Jr. | ............. | 369/112.12 |
| 5,523,993 A * | 6/1996 | Freeman | ................ | 369/112.04 |
| 5,754,503 A * | 5/1998 | Senba et al. | ............. | 369/44.23 |
| 5,909,423 A * | 6/1999 | Fukui et al. | ............ | 369/112.12 |
| 6,055,076 A * | 4/2000 | Takahashi et al. | ....... | 369/112.1 |
| 6,125,087 A * | 9/2000 | Ohnishi et al. | .......... | 369/44.23 |
| 6,185,167 B1 * | 2/2001 | Arai et al. | ............... | 369/44.23 |
| 6,407,967 B1 * | 6/2002 | Odajima et al. | ......... | 369/44.23 |

FOREIGN PATENT DOCUMENTS

JP 2002-251753 9/2002

OTHER PUBLICATIONS

Japanese Office Action dated May 24, 2005.

* cited by examiner

*Primary Examiner*—Andrea Wellington
*Assistant Examiner*—Kim-Kwok Chu
(74) *Attorney, Agent, or Firm*—Staas & Halsey LLP

(57) ABSTRACT

An optical pickup apparatus includes a first light source to emit a first light beam having a predetermined wavelength, a first optical path changer to change a proceeding path of the first light beam, an objective lens to focus the first light beam on a recording medium, a diffraction member to divide the first light beam reflected by the recording medium into five light regions, the diffraction member having a first diffraction region having a wide width in a direction corresponding to a tangential direction of the recording medium and second through fifth diffraction regions sequentially arranged around the outside of the first diffraction region in a direction corresponding to a radial direction of the recording medium, and a first photodetector having first through fifth light receiving portions to receive the first light beam reflected by the recording medium.

46 Claims, 8 Drawing Sheets

OPTICAL PICKUP APPARATUS AND OPTIMAL LIGHT SPOT FOCUSING METHOD

CROSS-REFERENCE TO RELATED APPLICATION

This application claims the benefit of Korean Application No. 2001-19647, filed Apr. 12, 2001, in the Korean Intellectual Property Office, the disclosure of which is incorporated herein by reference.

BACKGROUND OF THE INVENTION

1. Field of the Invention

The present invention relates to an optical pickup apparatus that detects a tracking error signal and is not sensitive to the occurrence of an offset due to a shaking of an objective lens and a focus error signal in which the occurrence of an offset due to a deviation of a photodetector from a design location, a change in temperature, and/or a change in the wavelength of a light beam is reduced, and to a method of optimally focusing a light spot.

2. Description of the Related Art

Accurate detection of a focus and/or tracking error signal in recording and/or reproduction of a high capacity disc is necessary to perform a stable servo function. In general, an optical pickup apparatus includes a light source, an objective lens to focus a light beam emitted from the light source on a recording surface of an optical disc, and a light receiving optical system to detect an information signal and an error signal from a light beam reflected by the optical disc and having passed through the objective lens.

For an optical pickup apparatus in which a focus error signal is detected in an astigmatism method, the light receiving optical system is configured as shown in FIG. 1. Referring to FIG. 1, the light beam that is reflected by an optical disc (not shown) and having passed through an objective lens (not shown) is focused by a detection lens 2, passes through an adjustment lens 4 to adjust astigmatism of the reflected light beam, and is detected by a photodetector 6. As shown, the photodetector 6 has four light receiving areas A, B, C, and D arranged in a 2×2 matrix.

The light receiving areas A, B, C, and D and associated detection signals of the respective light receiving areas A, B, C, D are indicated by the same reference letters. An information signal RFS is detected by summing the detection signals of the light receiving areas A, B, C, and D, as shown in Equation 1:

$$RFS=(A+B+C+D) \quad \text{Equation 1}$$

A focus error signal (FES) by the astigmatism method is detected by summing ones of the detection signals of the light receiving areas A, B, C, D adjacent in a diagonal direction and subtracting the summed signals, as shown in Equation 2:

$$FES=(A+C)-(B+D) \quad \text{Equation 2}$$

A tracking error signal ($TES_{pp}$) by a push-pull method is detected by summing ones of the detection signals of the light receiving areas A, B, C, D and adjacent and parallel to a track direction and subtracting the summed signals, as shown in Equation 3. Also, a tracking error signal ($TES_{DPD}$) by a differential phase detection is detected by obtaining the phase of a sum signal of ones of the detection signals of the light receiving areas A, B, C, D adjacent in a diagonal direction and subtracting the obtained phases, as shown in Equation 3:

$$TES_{pp}=(A+D)-(B+C) \quad \text{Equation 3}$$

$$TES_{DPD}=\text{phase}(A+C)-\text{phase}(B+D)$$

Here, the push-pull method is used, for example, in the recording/reproduction of a DVD-RAM optical disc and in the recording of a DVD-R/RW optical disc. The differential phase detection method is used, for example, in the reproduction of a DVD-ROM optical disc and a DVD-R/RW optical disc.

An optical pickup apparatus having the conventional light receiving optical system has the following disadvantages. First, since the size of a light spot formed on the photodetector 6 is small, the focus error signal and tracking error signal are sensitive to a deviation of the photodetector 6 from a design location. Accordingly, an offset occurs in which the focus and tracking error signal is a value other than 0 at an on-focus and on-track position. Second, when the objective lens is shaken at the original position due to a seek or the decentering of an optical disc, the light beam is shifted on the photodetector 6 so that an offset is generated as to the push-pull signal. Third, when the focus error signal is detected with respect to a land/groove type optical disc, such as a DVD-RAM optical disc, by using the astigmatism method, cross talk is largely generated in the focus error signal due to the groove even in an on-focus state so that the optimal focus position of the land/groove is different. Fourth, the wavelength of a light beam emitted from the light source changes due to a change of temperature. Accordingly, the refractive power of the optical system changes. In most optical devices, the refractivity decreases as the wavelength increases. Thus, an offset is generated as to the focus error signal due to the change in temperature/wavelength.

SUMMARY OF THE INVENTION

To solve the above and other problems, it is an object of the present invention to provide an optical pickup apparatus that detects a tracking error signal that is not sensitive to the occurrence of an offset due to a shaking of an objective lens and a focus error signal in which the occurrence of an offset due to a deviation of a photodetector from a design location, a change in temperature, and/or a change in the wavelength of a light beam is reduced, and a focus error signal in which an effect of a groove with respect to a land/groove type optical disc is decreased, and to a method of optimally focusing a light spot to enable the tracking of an optimal focal point of a light spot by using the optical pickup apparatus.

Additional objects and advantages of the invention will be set forth in part in the description which follows and, in part, will be obvious from the description, or may be learned by practice of the invention.

To achieve the above and other objects, an optical pickup apparatus according to an embodiment of the invention includes a first light source to emit a first light beam having a predetermined wavelength, a first optical path changer to change a proceeding path of the first light beam incident thereon, an objective lens to receive the first light from the first optical path changer and to form a light spot on a recording medium by focusing the first light beam, a diffraction member to divide the first light beam reflected by the recording medium and incident thereon into five light regions and to diffract the first light beam, the diffraction member having a first diffraction region being wider in width in a tangential direction corresponding to a tangential direction of the recording medium than in a radial direction corresponding to a radial direction of the recording medium, and second through fifth diffraction regions arranged around both sides of the first diffraction region in the radial direction, and a first photodetector having first through fifth light receiving portions to receive the first light beam reflected by the recording medium and diffracted by the first through fifth diffraction regions of the diffraction member.

According to an aspect of the present invention, the first through fifth diffraction regions each include a pattern to diffract the incident first light beam to be split into the $0^{th}$ order and $\pm 1^{st}$ order light beams to make the $+1^{st}$ order beam and/or $-1^{st}$ order beam be received by the photodetector after being separated from each other.

According to another aspect of the present invention, the pattern of each of the second through fifth diffraction regions makes one of the $\pm 1^{st}$ order beams divergent compared to the $0^{th}$ order beam and the other of the $\pm 1^{st}$ order beams convergent compared to the $0^{th}$ order beam.

According to yet another aspect of the present invention, the first diffraction region includes an astigmatism generation pattern so that the $\pm 1^{st}$ order beams are magnified in the radial direction corresponding to a radial direction of the recording medium.

According to still another aspect of the present invention, the optical pickup apparatus further comprises a second light source to emit a second light beam having a wavelength different from a wavelength of the first light source, and a second optical path changer to guide a proceeding path of the second light beam received from the second light source and the first light beam received from the first optical path changer toward the objective lens, so that recording media in different formats are compatibly adopted in the optical pickup apparatus.

According to yet still another aspect of the present invention, the optical pickup apparatus further comprises a second photodetector to receive the second light beam emitted from the second light source and reflected by the recording medium, and a hologram member to selectively diffract an incident light beam and is between the second light source and the second optical path changer, where the second light source, the second photodetector, and the hologram member are incorporated into a single optical module.

According to a further aspect of the present invention, the optical pickup apparatus further comprises a front photodetector to monitor an optical power of the first and/or second light sources, provided at one side of the second optical path changer.

According to a yet further aspect of the present invention, one of the first and second light sources emits a light beam having a wavelength suitable to record and/or reproduce with respect to a CD family recording medium and the other of the first and second light sources emits a light beam having a wavelength suitable to record and/or reproduce with respect to a DVD family recording medium.

According to a still further aspect of the present invention, the optical pickup apparatus further comprises an aperture filter, disposed on an optical path between the second optical path changer and the objective lens and having an aperture of a predetermined diameter in which a pattern formed around the aperture to diffract the light beam emitted from the one of the first and second light sources and to transmit the light beam emitted from the other of the first and second light sources straight.

According to a yet still further aspect of the present invention, the optical pickup apparatus further includes a phase compensator, disposed on the optical path between the second optical path changer and the objective lens, to compensate for spherical aberration due to a thickness of the recording medium during the recording/reproduction of the recording medium, the recording medium having a thickness that is different than a thickness for which the objective lens is optimized.

According to an additional aspect of the present invention, the diffraction member, arranged between the first optical path changer and the objective lens, comprises a polarization hologram layer to transmit the first light beam straight toward the recording medium from the first light source and to diffract the first light beam reflected by the recording medium, and a polarization changing layer formed at a side of the polarization hologram layer facing the recording medium to change a polarization of an incident light beam.

According to a yet additional aspect of the present invention, the diffraction member is arranged between the second optical path changer and the objective lens, and the polarization hologram layer of the diffraction member selectively diffracts the first light beam according to the polarization thereof and transmits the second light beam, as is, regardless of the polarization thereof.

According to a still additional aspect of the present invention, the photodetector further comprises a main light receiving portion to receive and detect the $0^{th}$ order beam that is not diffracted by the first through fifth diffraction regions.

According to a yet still additional aspect of the present invention, the first light receiving portion has four-divided light receiving regions divided in the radial and tangential directions, the four-divided light receiving regions to receive the $+1^{st}$ order or the $-1^{st}$ order beams diffracted by the first diffraction region, and the second through fifth light receiving portions include light regions to receive the $+1^{st}$ order or the $-1^{st}$ order beams diffracted by the second through fifth diffraction regions.

According to another aspect of the present invention, assuming that the detection signals of the light regions of the second through fifth light receiving portions are A, B, C, and D and the detection signals of the four-divided light receiving regions of the first light receiving portion are E, F, G, H, when the first light beam incident on the diffraction member after being reflected by the recording medium is divided into four light regions along axes parallel to the radial and tangential directions, the optical pickup apparatus further comprises a signal processing unit to detect a tracking error signal by a difference in the phases of a sum signal of the detection signals E and G of the light receiving regions of the first light receiving portion with respect to the light regions adjacent in one diagonal direction and the detection signals F and H of the light receiving regions of the first light receiving portion with respect to light regions arranged in the other diagonal direction.

According to yet another aspect of the present invention, the signal processing unit detects a tilt error signal by a difference in the phases of the sum signal of the detection signals E and H of a pair of the light regions adjacent and parallel to the radial direction and a sum signal of the detection signals F and G of the remaining light regions.

According to still another aspect of the present invention, the signal processing unit detects a tilt error signal by a difference in the phases of a sum signal of the detection signals of the light receiving regions of the second and fourth light receiving portions with respect to light receiving regions adjacent in a first diagonal direction and the detection signals F and H of the light receiving regions of the first light receiving portion with respect to light receiving regions adjacent in a second diagonal direction, and a sum signal of the detection signals of the light receiving regions of the third and fifth light receiving portions with respect to light receiving regions arranged in the second diagonal direction and the detection signals E and G of the light receiving regions of the first light receiving portion with respect to light receiving regions arranged in the first diagonal direction.

According to yet still another aspect of the present invention, each of the second through fifth light receiving portions further includes two-divided light receiving regions divided in a direction corresponding to the tangential direction of the recording medium and to receive a diffracted light beam of the remaining one of the $+1^{st}$ and $-1^{st}$ order beams, and each of the two-divided light receiving regions of the second through fifth light receiving portions includes an inner light receiving region to receive a central portion of the first light beam and an outer light receiving region to receive an outer portion of the first light beam in a direction corresponding to the tangential direction of the recording medium.

According to a further aspect of the present invention, assuming that detection signals of the inner and outer light receiving regions of the second light receiving portion are A1 and A2, detection signals of the inner and outer light receiving regions of the third light receiving portion are B1 and B2, detection signals of the inner and outer light receiving regions of the fourth light receiving portion are C1 and C2, and detection signals of the inner and outer light receiving regions of the fifth light receiving portion are D1 and D2, the signal processing unit detects a focus error signal FES as expressed in the following Equation:

$FES=(A2+B1+C2+D1)-(A1+B2+C1+D2).$

According to a still further aspect of the present invention, the signal processing unit detects a tilt error signal $S_{tilt}$ as expressed in the following Equation:

$S_{tilt}=(A1+B1+C2+D2)-(A2+B2+C1+D1).$

According to a yet further aspect of the present invention, the signal processing unit detects a tracking error signal using a differential signal or a sum signal between a first push-pull signal with respect to the detection signals A, B, C, and D and a second push-pull signal with respect to the detection signals E, F, G, and H.

According to another aspect of the present invention, the signal processing unit adjusts an optimal focus position of a light spot by a differential signal between a sum signal of the detection signals A, B, C, and D and a sum signal of the detection signals E, F, G, and H.

To achieve the above and other objects, there is provided a method of optimal focusing of a light spot by which seeking of an optimal focal point of a light spot is possible, the method according to another embodiment of the invention including detecting signals by dividing a light beam after being radiated from a light source onto a recording medium and reflected from the recording medium into first through fourth light regions in tangential and radial directions corresponding to tangential and radial directions of a recording medium and dividing the first through fourth light regions into an inner light receiving region and an outer light receiving region in the radial direction, obtaining a subtracting signal between a sum signal of detections signals of the outer light receiving regions and a sum signal of detection signals of the inner light receiving regions, and focusing a light spot onto a position where the size of the differential signal is minimized.

BRIEF DESCRIPTION OF THE DRAWINGS

The above and other objects and advantages of the present invention will become more apparent and more readily appreciated by describing in detail embodiments thereof with reference to the accompanying drawings in which.

DETAILED DESCRIPTION OF THE EMBODIMENTS

Figure 1:
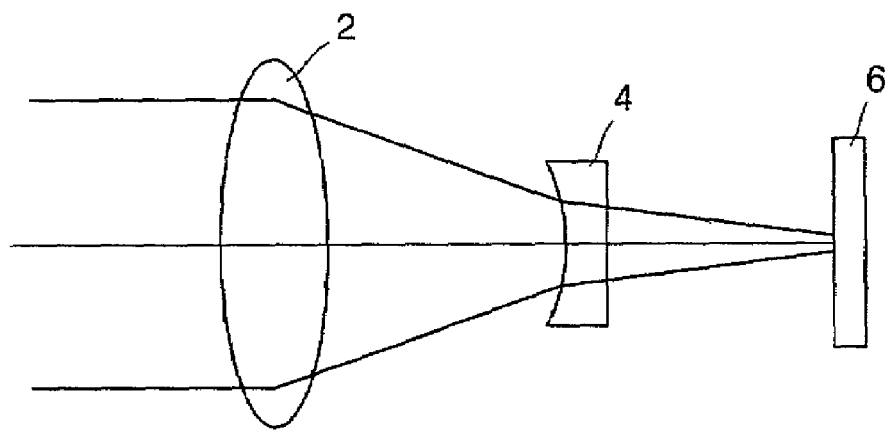
FIG. 1 is a view showing a conventional light receiving optical system to detect a focus error signal in an astigmatism method.
Figure 2:
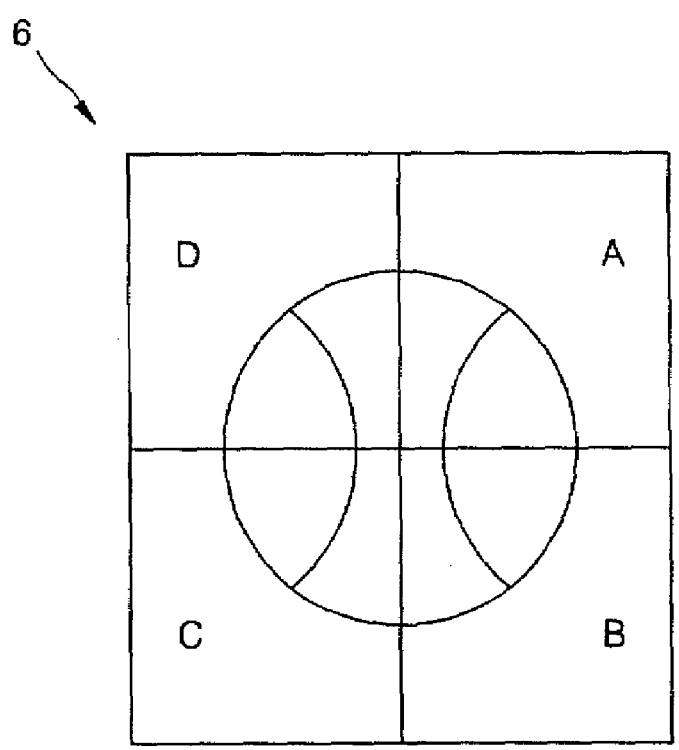
FIG. 2 is a plan view showing the photodetector of FIG. 1.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

In the embodiments described below, although an optical pickup apparatus according to an embodiment of the present invention is shown to be configured to compatibly use CD family optical discs and DVD family optical discs, the present invention is not limited thereto and is understood to be used with other optical recording media. For instance, the technology according to the present invention can be used in an optical pickup apparatus which can compatibly use the DVD family optical discs, next generation DVD family optical discs. Also, the present technology can be applied to an optical pickup apparatus for use optical discs of only one family.

Figure 3:
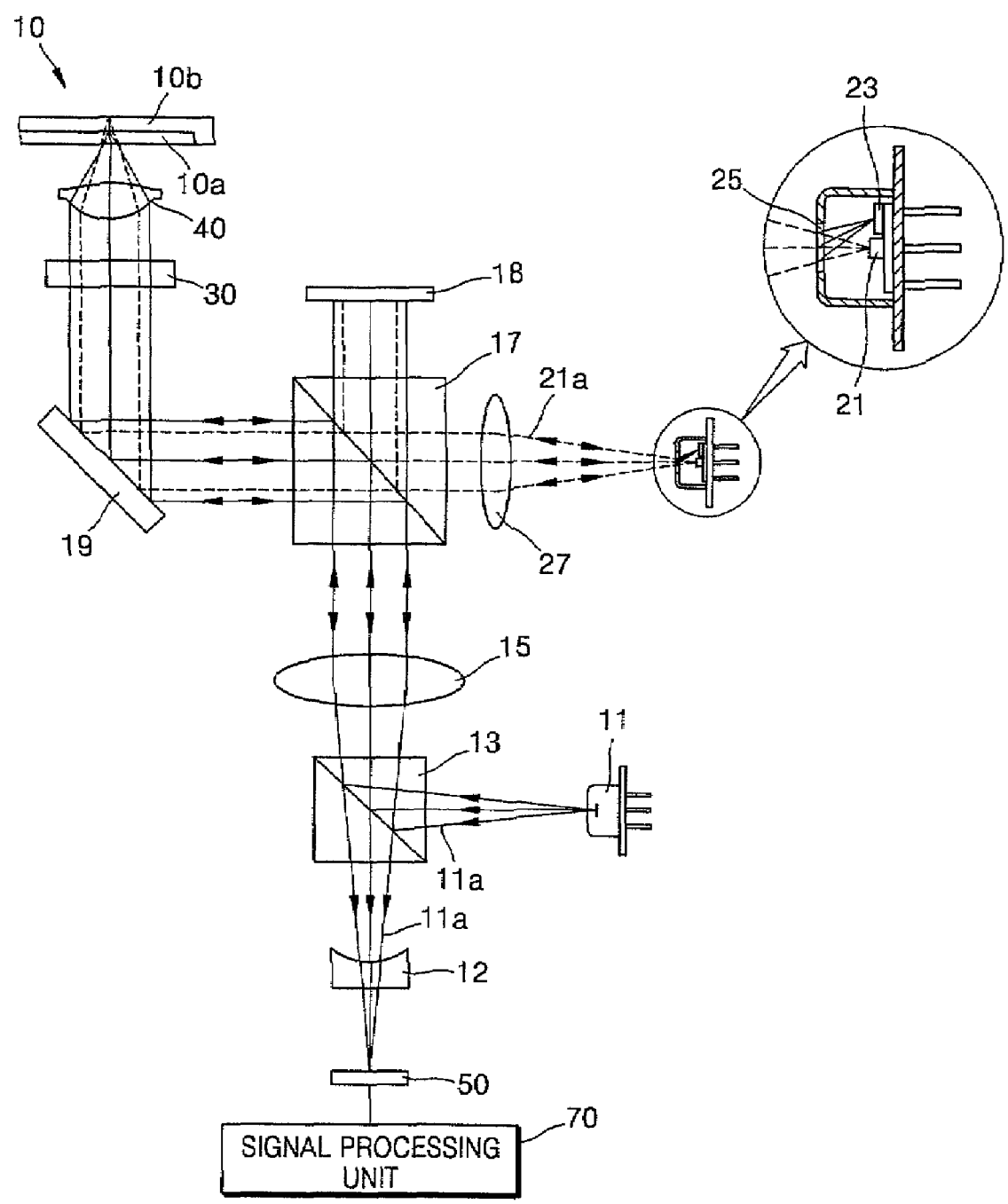
FIG. 3 is a view showing the optical configuration of an optical pickup apparatus according to an embodiment of the present invention.

Referring to FIG. 3, an optical pickup apparatus according to an embodiment of the present invention includes a first light source 11 to emit a first light beam 11a to record and/or reproduce a first optical disc 10a, an objective lens 40 to focus an incident light beam so as to form a light spot on an optical disc 10a, a diffraction member 30 to diffract the incident first light beam 11a by dividing it into five light regions, a first optical path changer 13 to change a proceeding path of the first light 11a, and a photodetector 50 to receive the first light 11a diffracted by the diffraction member 30 and to perform a photoelectric conversion so as to produce detection signals for use by the signal processing unit 70.

Also, to compatibly adopt an optical disc 10b in a different format than the optical disc 10a, the optical pickup apparatus of the present invention includes a second light source 21 to emit a second light beam 21a to record and/or reproduce a second optical disc 10b in a different format from the first optical disc 10a, and a second optical path changer 17 to guide the proceeding path of the first and second light beams 11a and 21a to be incident on the diffraction member 30 using a mirror 19. However, it is understood that the second light source 21 and the second optical path changer 17 need not be used in an embodiment of the invention in which a second optical disc 10b is not useable in the optical pickup apparatus.

The first and second light beams 11a and 21a emitted from the first and second light sources 11 and 21 have different wavelengths from each other. For example, when the first and second optical discs 10a and 10b are a DVD family optical disc and a CD family optical disc, respectively, the first light beam 11a and the second light beam 21a have, for example, a 650 nm wavelength and a 780 nm wavelength, respectively.

The objective lens 40 is optimally designed with respect to the wavelength of the first light beam 11a and the thickness of the first optical disc 10a. However, the objective lens 40 need not be so optimized in all aspects of the invention.

Figure 4:
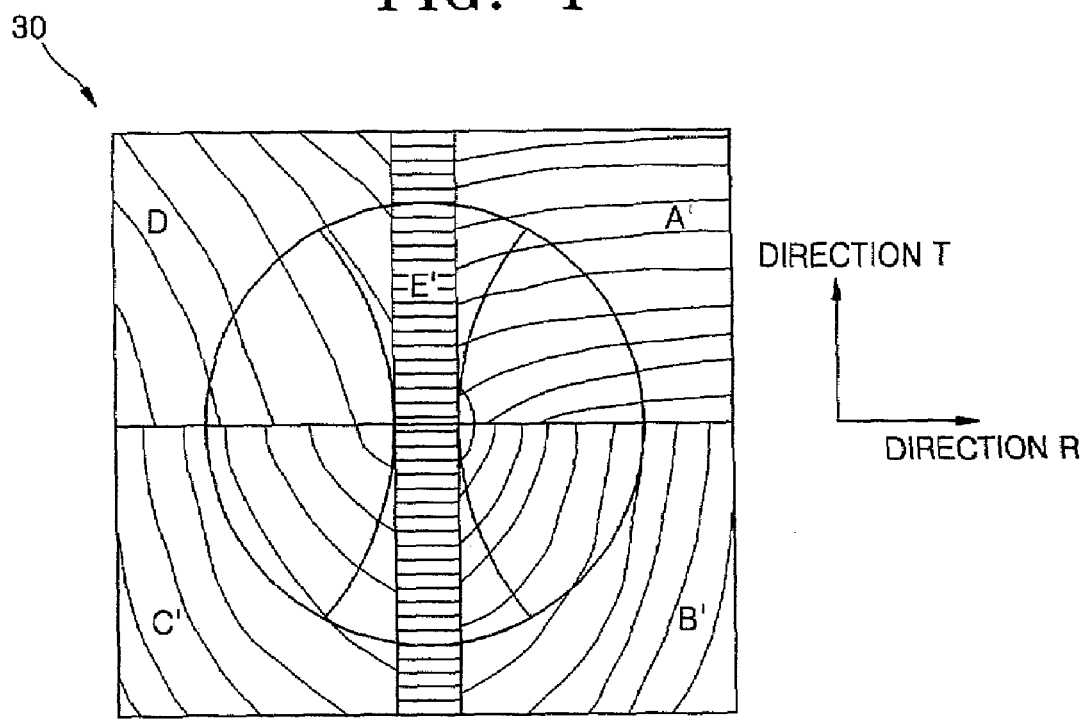
FIG. 4 is a plan view showing the structure of a diffraction area of a diffraction member used in the optical pickup apparatus according to an embodiment of the present invention.

Referring to the embodiment shown in FIG. 4, the diffraction member 30 has five diffraction regions A', B', C', D', and E' to divide the first light beam 11a reflected by the optical disc 10 into five light regions and simultaneously diffract the divided first light beam 11a. The first diffraction region E' has a large width in a direction (hereinafter, called the "direction T") corresponding to the tangential direction of the optical disc 10. As shown, the first diffraction region E' extends across the diffraction member 30. The diffraction member 30 also includes second through fifth diffraction regions A', B', C', and D' arranged sequentially around the first diffraction region E' in a direction (hereinafter, called the "direction R") corresponding to the radial direction of the optical disc 10. As shown, the second and third diffraction regions A', B', are arrayed in the direction T on one side of the first diffraction region E', and the fourth and fifth diffraction regions C', D' are arrayed in the direction T on the other side of the first diffraction region E'. The first and fifth diffraction regions A', D' are aligned in the direction R, but are separated by the first diffraction region E'. The second through fifth diffraction regions A', B', C', and D' form a 2×2 matrix.

The first through fifth diffraction regions E', A', B', C', and D' diffract the incident first light beam 11a reflected by the optical disc 10 into $0^{th}$ and $\pm 1^{st}$ order beams. Further, while not required in all aspects of the invention, an astigmatism generation hologram pattern is formed in the first diffraction region E' to magnify the $\pm 1^{st}$ order beams in the direction R. When the $\pm 1^{st}$ order beams are magnified by the first diffraction region E' in the direction R, the difference in the amount of light according to a shift of the objective lens 40 can be reduced during the detection of a push-pull signal. Thus, a tracking error signal having an offset reduced can be detected during the shift of the objective lens 40.

Figure 6:
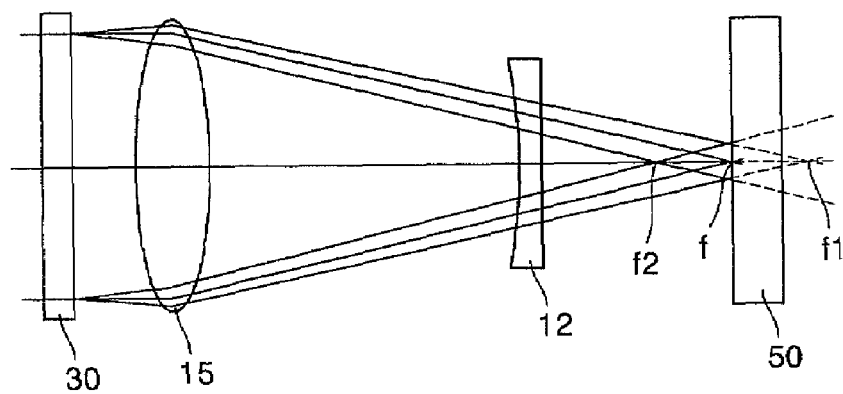
FIG. 6 is a view showing the focus position of a diffraction beam according to the divergence and convergence characteristics of a diffracted beam diffracted by the diffraction member shown in FIG. 4.

Each of the second through fifth diffraction regions A', B', C', and D' has a hologram pattern which makes a light beam having one diffraction order of the $\pm 1^{st}$ order beams divergent compared to the $0^{th}$ order beam and a light beam having the other diffraction order convergent compared to the $0^{th}$ order beam. For example, the second and fourth diffraction regions A' and C' have corresponding patterns that converge the $+1^{st}$ order beam and diverge the $-1^{st}$ order beam with respect to the $0^{th}$ order beam, and the third and fifth diffraction regions B' and D' have corresponding patterns to diverge the $+1^{st}$ order beam and converge the $-1^{st}$ order beam with respect to the $0^{th}$ order beam. In this case, as shown in FIG. 6, the $-1^{st}$ order beam diffracted by the second and fourth diffraction regions A' and C' and the $+1^{st}$ order beam diffracted by the third and fifth regions B' and D' are focused at a first focal point f1. The $+1^{st}$ order beam diffracted by the second and fourth diffraction regions A' and C' and the $-1^{st}$ order beam diffracted by the third and fifth regions B' and D' are focused at a second focal point f2. The photodetector 50, in the on-focus state, is disposed between the first and second focal points f1 and f2, preferably, at the focal point f of the $0^{th}$ order beam.

Figure 7:
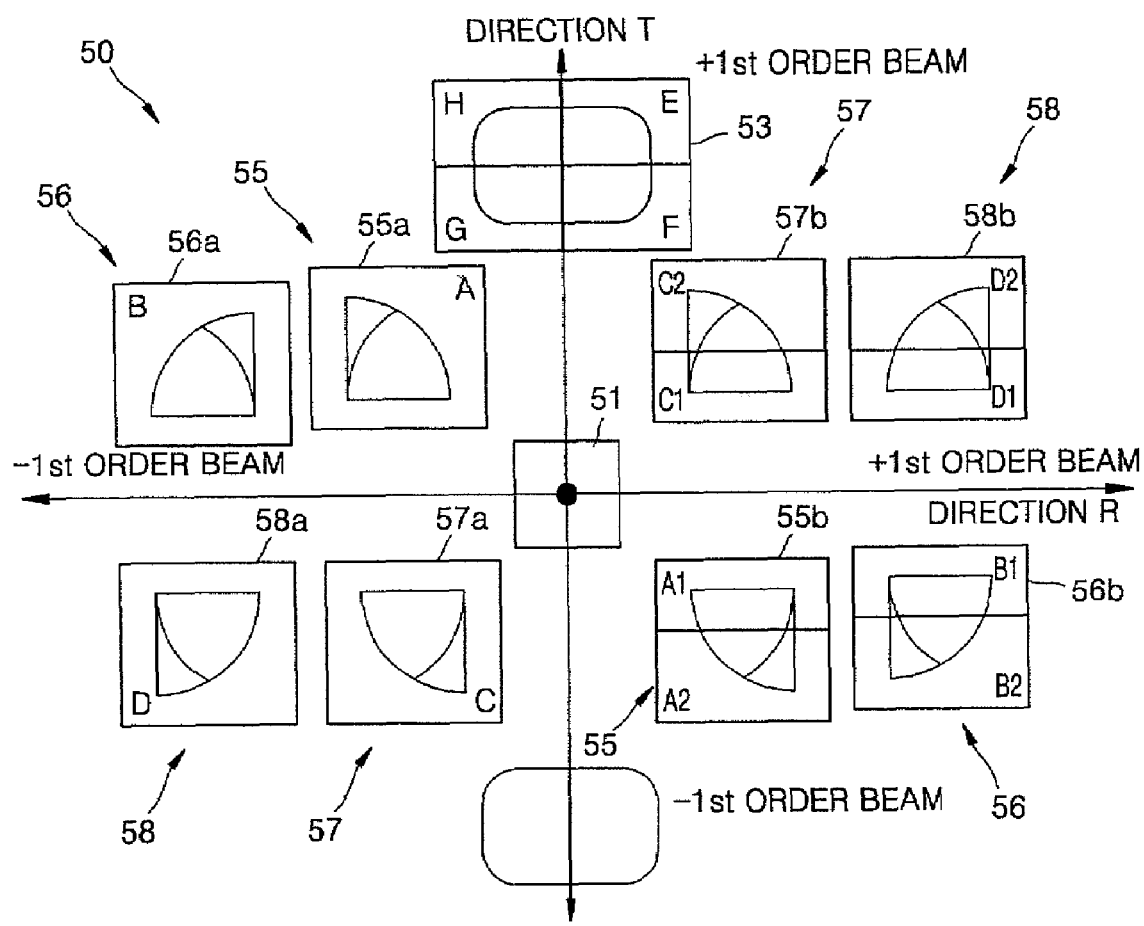
FIG. 7 is a plan view showing a photodetector according to a further embodiment of the present invention, which receives the $0^{th}$ and $\pm1^{st}$ order beams diffracted by the diffraction area structure of the diffraction member of FIG. 4.

The first through fifth diffraction regions E', A', B', C', and D' are formed to diffract the incident first light beam 11a reflected by the optical disc 10 to be split into the $0^{th}$ order beam and the $\pm 1^{st}$ order beams and make the $+1^{st}$ order beams and/or the $-1^{st}$ order beams be received by the photodetector 50 after being separated from each other as shown in FIG. 7.

Figure 5:
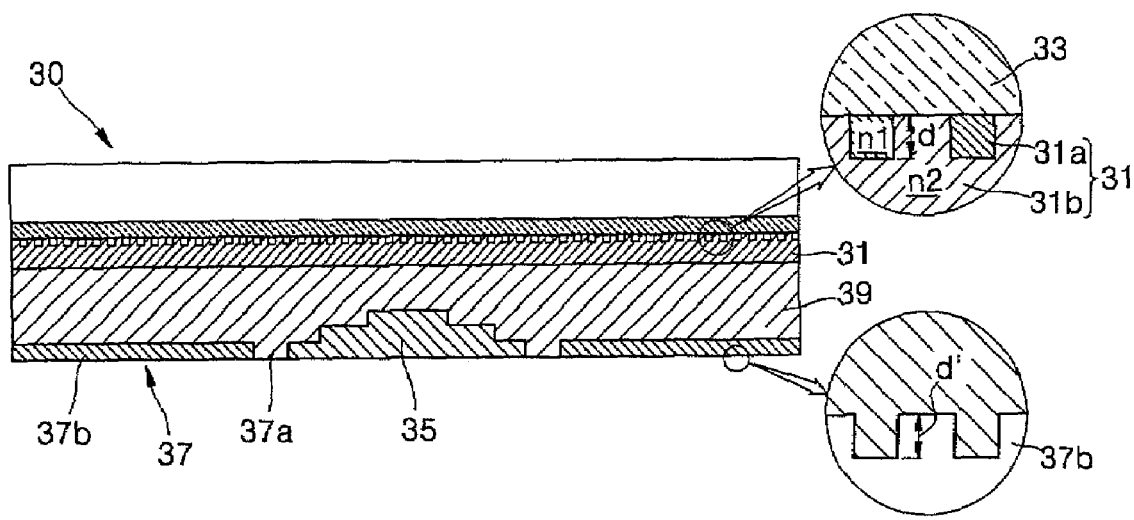
FIG. 5 is a sectional view of an example of the diffraction member for an optical pickup apparatus having the optical configuration of FIG. 3.

The diffraction member 30 is arranged on the optical path between the first optical path changer 13 and the objective lens 40. In this embodiment, the diffraction member 30 is a polarization hologram member to increase the efficiency of light, but other types of diffractions members 30 can be used. That is, the diffraction member 30, as shown in FIG. 5, includes a polarization hologram layer 31 to selectively diffract an incident light beam according to a polarization and a wavelength thereof, and a polarization changing layer 33, formed at the side toward the optical disc 10 of the polarization hologram layer 31, to change the polarization of the incident light beam. The polarization hologram layer 31 is patterned by being divided into the first through fifth diffraction regions E', A', B', C', and D' to transmit the first light beam 11a having a predetermined linear polarization, for example, a P polarization, directly to the optical disc 10. The polarization hologram layer 31 diffracts the first light beam 11a having a different linear polarization, for example, an S polarization, which is reflected by the optical disc 10 and has a polarization changed by the polarization changing layer 33 to be perpendicular to the first light beam 11a of a P polarization.

In detail, a first refractive index substance area 31a and a second refractive index substance area 31b are alternately formed in the polarization hologram layer 31. FIG. 5 shows an example in which the first refractive index substance area 31a having a thickness of d is formed inside the second refractive index substance area 31b at a periodic predetermined interval. Assuming that the refractive index of the first and second refractive index substance areas 31a and 31b are n1 and n2, respectively, the polarization hologram layer 31 is formed such that the difference in the optical path of a light beam passing through the first and second refractive index substance areas 31a and 31b at a portion where the first and second refractive index substance areas 31a and 31b are alternately arranged is not an integral multiple of the wavelength of the first light beam 11a, for example, a wavelength of 650 nm. Also, the first and second refractive index substance areas 31a and 31b are formed to have the same ordinary refractive indexes with respect to a predetermined linear polarization of the first light beam 11a prior to being reflected, and extraordinary refractive indexes different from each other with respect to a different linear polarization perpendicular to the first light beam 11a incident by being reflected after the optical disc 10.

As shown in FIG. 3, when the diffraction member 30 is arranged on the optical path between the second optical path changer 17 and the objective lens 40, the polarization hologram layer 31 is formed to selectively diffract the first light beam 11a according to the polarization thereof and simultaneously prevent diffraction of the second light beam 21a having a different wavelength with the first light beam 11a with respect to both P and S polarizations. Specifically, the polarization hologram layer 31 is formed such that the difference in the optical path at the first and second refractive index substance areas 31a and 31b at a portion where the first and second refractive index substance areas 31a and 31b are alternately arranged is not an integral multiple of the wavelength of the second light beam 21a, for example, 780 nm. In this case, the first light beam 11a is selectively diffracted in the polarization hologram layer 31 according to the polarization thereof and the second light beam 21a is not diffracted regardless of the polarization when passing through the polarization hologram layer 31.

According to an embodiment of the invention, the polarization changing layer 33 is a quarter wave plate with respect to the first light beam 11a. When the above polarization hologram member layer 31 is provided as the diffraction member 30, a polarization beam splitter is provided as the first optical path changer 13 to further increase the efficiency of light.

Referring back to FIG. 5, the optical pickup apparatus according to an embodiment of the present invention includes an aperture filter 37 to adjust an aperture of the first or second light beams 11a and 21a and a phase compensator 35 to compensate for spherical aberration occurring due to the difference in the thickness of an optical disc during the recording/reproduction of the optical disc having the thickness out of a range of a design condition of the objective lens 40. However, having one or both of the aperture filter 37 and the phase compensator 35 is not required in all aspects of the invention.

When the diffraction member 30 according to the present invention is arranged between the second optical path changer 17 and the objective lens 40, as shown in FIG. 3, the aperture filter 37 and the phase compensator 35 can be formed integrally with the diffraction member 30, with a transparent base 39 interposed therebetween, as shown in FIG. 5. Of course, it is understood that either or both of the aperture filter 37 and the phase compensator 35 may also be optical devices independent of the diffraction member 30.

Since the objective lens 40 is optimized with respect to the first optical disc 10a using the first light beam 11a emitted from the first light source 11, the aperture filter 37 is formed to limit an aperture 37a with respect to the second light beam 21a. Specifically, the aperture filter 37 has the aperture 37a having a predetermined diameter. A pattern portion 37b having a height d', which is an integral multiple of the wavelength of the first light beam 11a, is formed around the aperture to limit the aperture 37a. The pattern portion 37b of the aperture filter 37 transmits the first light beam 11a emitted from the first light source 11, as is, and diffracts all the second light beam 21a emitted from the second light source 21 so as not to be incident on the objective lens 40. As shown, the aperture 37a of the aperture filter 37 is formed to achieve, for example, a numerical aperture of 0.5 so that information can be recorded on a recordable optical disc for recording such as CD-RWs. However, other numerical apertures can be achieved using other aperture filters 37.

When the phase compensator 35 is incorporated into the diffraction member 30 to minimize a thickness of the diffraction member 30 as shown in FIG. 5, the phase compensator 35 is formed in the aperture 37a of the aperture filter 37. However, it is understood that the phase compensator 35 can be formed in other areas. Wherever formed, the phase compensator 35 compensates for properties such as the spherical aberration due to the difference in the thickness of the second optical disc 10b during recording/reproduction of the second optical disc 10b. Specifically, since the second optical disc 10b has a thickness out of a range of a design condition of the objective lens 40, which is optimized for the first optical disc 10a having a different thickness, the phase compensator 35 generates a reverse spherical aberration to the second light beam 21a emitted from the second light source 21 to perform the compensation.

The photodetector 50, as shown in FIG. 7, has first through fifth light receiving portions 53, 55, 56, 57, and 58 to receive the first light beam 11a diffracted by the first through fifth diffraction regions E', A', B', C', and D' of the diffraction member 30 and to perform a photoelectric conversion. The first light receiving portion 53 has four-divided light receiving regions E, F, G, and H, which are divided along the R direction and T direction of the optical disc 10 and receive the $+1^{st}$ order beam diffracted by the first diffraction region E'. Alternatively, the first light receiving portion 53 can receive the $-1^{st}$ order beam diffracted by the first diffraction region E'. In the embodiment shown in FIG. 7, the light regions E and H are formed parallel in the direction R, the light regions F and G are formed parallel in the direction R, and the light regions E and F are parallel in the direction T.

The second through fifth light receiving portions 55, 56, 57, and 58 include singular light receiving regions 55a, 56a, 57a, and 58a, respectively, each of which receives the $-1^{st}$ order beam diffracted by the second through fifth diffraction regions A', B', C', and D'. As shown, the singular light receiving regions 55a and 56a are roughly parallel along the direction R, the singular light receiving regions 57a and 58a are parallel along the direction R, and the singular light receiving regions 55a and 57a are parallel along the direction T.

While not required in all aspects, the second through fifth light receiving portions 55, 56, 57, and 58 further include two-divided light receiving regions 55b, 56b, 57b, and 58b to receive the $+1^{st}$ order beams diffracted by the second through fifth diffraction regions A', B', C', and D'. As shown, the two-divided light receiving regions 55b, 56b, 57b, and 58b and the singular light receiving regions 55a, 56a, 57a, and 58a are arranged to receive the $-1^{st}$ order beams and the $+1^{st}$ order beams, respectively.

As shown in FIG. 7, the two-divided light receiving regions 55b and 56b are roughly parallel along the direction R, the two-divided light receiving regions 57b and 58b are parallel along the direction R, and the two-divided light receiving regions 55b and 57b are parallel along the direction T. In addition, the two-divided light receiving region 55b is adjacent diagonally with the singular light receiving region 55a in a first diagonal direction, and the two-divided light receiving region 57b is adjacent diagonally with the singular light receiving region 57a in a second diagonal direction. The two-divided light receiving region 56b and the singular light receiving region 56a are adjacent diagonally, but are separated by the two-divided light receiving region 55b and the singular light receiving region 55a. The two-divided light receiving region 58b and the singular light receiving region 58a are adjacent diagonally, but are separated by the two-divided light receiving region 57b and the singular light receiving region 57a.

The two-divided light receiving regions 55b, 56b, 57b, and 58b each include inner light receiving regions A1, B1, C1, and D1 to receive the inner part of the first light beam 11a near the center thereof and outer light receiving regions A2, B2, C2, and D2 to receive the outer part of the first light beam 11a.

In FIG. 7, the reference letters denoting the four-divided light receiving regions E, F, G, and H of the first light receiving portion 53, the singular light receiving regions 55a, 56a, 57a, and 58a and the two-divided light receiving regions 55b, 56b, 57b, and 58b of the second through fifth light receiving portions 55, 56, 57, and 58 are considered to indicate detection signals thereof. Also, for the sake of convenience, the inner light receiving regions A1, B1, C1, and D1, the outer light receiving regions A2, B2, C2, and D2, and detection signals thereof are indicated by the same reference letters.

The $+1^{st}$ order beams and the $-1^{st}$ order beams diffracted by the first through fifth diffraction regions E', A', B', C', and D' and incident on the photodetector 50 are formed to be symmetrical to each other. At least one light receiving portion, for example, the singular light receiving region 56a and the two-divided light receiving region 56b of the third light receiving portion 56, is arranged to be shifted slightly in the direction T. Thus, the singular light receiving region 56a and the two-divided light receiving region 56b are not at the same height in the direction T compared to the singular light receiving regions 55a, 57a, and 58a and the two-divided light receiving regions 55b, 57b, and 58b of the second, fourth, and fifth light receiving portions 55, 57, and 58, with respect to the axis of coordinates parallel to the direction R and direction T.

When the wavelength of the first light beam 11a emitted from the first light source 11 increases during a write mode and due to the change in temperature, the positions of the $+1^{st}$ order beams and $-1^{st}$ order beams are far away from each other with respect to the origin of the axis of coordinates of FIG. 7. This means that the division ratio of the $+1^{st}$ order beams received by the inner light receiving regions A1, B1, C1, and D1 and the outer light receiving regions A2, B2, C2, and D2 of the two-divided light receiving regions 55b, 56b, 57b, and 58b changes. However, since the third light receiving portion 56 (i.e., the singular light receiving region 56a and the two-divided light receiving region 56b) deviates in the direction T with respect to other light receiving portions 55, 57, 58, and the amount of shift of the $+1^{st}$ order beam due to an increase of the wavelength is different from each other, an offset generated due to the different division ratios is canceled. Thus, even when the wavelength of the first light beam 11a changes, a focus error signal in which an offset is greatly reduced can be detected. Also, when the photodetector 50 is deviated due to the arrangement of the second through fifth light receiving portions 55, 56, 57, and 58, an offset occurring at the focus error signal is canceled. Furthermore, since the photodetector 50 receives the light divided in advance by the diffraction member 30, a tracking error signal is not related to the deviation of the photodetector 50.

The photodetector 50 preferably includes a main light receiving portion 51 to receive the $0^{th}$ order beam that is not diffracted by the first through fifth diffraction regions E', A', B', C', and D' and to detect a reproduction signal.

As shown in FIG. 3, to independently detect the first light beam 11a reflected by the first optical disc 10a and the second light beam 21a reflected by the second optical disc 10b, the optical pickup apparatus according to an embodiment of the present invention includes a photodetector 23 to receive the second light beam 21a emitted from the second light source 21 and reflected by the optical disc 10 and a hologram member 25 disposed between the second light source 21 and the second optical path changer 17 to selectively diffract an incident light beam. The second light source 21, the photodetector 23, and the hologram member 25 are incorporated into a single optical module, as shown in FIG. 3.

The structure of the photodetector 23 and the principles of detecting a reproduction signal and/or an error signal for the realization of the tracking and the focus servo using a signal output from the photodetector 23 are, for example, substantially the same as those of an optical pickup apparatus for CD-RW, which is generally well known in the field to which the present invention pertains. Thus, a detailed description thereof will be omitted.

The optical pickup apparatus according to an embodiment of the present invention includes an external front photodetector 18 to monitor the optical power of the first and/or second light sources 11 and 21. The front photodetector 18, as shown in FIG. 3, is installed at one side of the second optical path changer 17 and can be commonly used to monitor the optical power of the first and second light sources 11 and 21. When the front photodetector 18 is commonly used, the number of signal lines connected to a circuit can be reduced so that the size of the optical pickup apparatus according to the present invention can be reduced.

While not required in all aspects of the invention, the second optical path changer 17 comprises a beam splitter to reflect most of the first light beam 11a and transmit most of the second light beam 21a.

In FIG. 3, a first collimating lens 15 collimates the first light beam 11a emitted from the first light source 11. A second collimating lens 27 collimates the second light beam 21a emitted from the second light source 21. An adjustment lens 12 is arranged between the first optical path changer 13 and the photodetector 50. The adjustment lens 12 adjusts astigmatism of the first light beam 11a reflected by the optical disc 10 and proceeding toward the photodetector 50 so that a focus error signal can be detected. The reflection mirror 19, while not always required, is used to reflect light traveling between the diffraction member 30 and the second optical path changer 17.

In the optical pickup apparatus having the above optical structure according to an embodiment of the present invention, during recording/reproduction of the first optical disc 10a, a reproduction signal, a tracking error signal detected using a phase difference detection method, a tracking error signal detected using a push-pull method, a focus error signal, and a tilt error signal can be detected from a detection signal of the photodetector 50. The reproduction signal is detected by using the detection signal of the main light receiving portion 51. When the reproduction signal is detected by using only the main light receiving portion 51, since the area to receive light is small, a frequency characteristic of a reproduction signal is improved. The tracking error signal detected using a push-pull method is detected by subtracting a first push-pull signal PP1 with respect to the detection signals A, B, C, and D of the singular light receiving regions 55a, 56a, 57a, and 58a of the second through fifth light receiving portions 55, 56, 57, and 58, and a second push-pull signal PP2 with respect to the detection signals E, F, G, and H of the four-divided light receiving regions of the first light receiving portion 53. Here, the second push-pull signal PP2 is preferably amplified by a predetermined gain k and subtracted from the first push-pull signal PP1.

Figure 8:
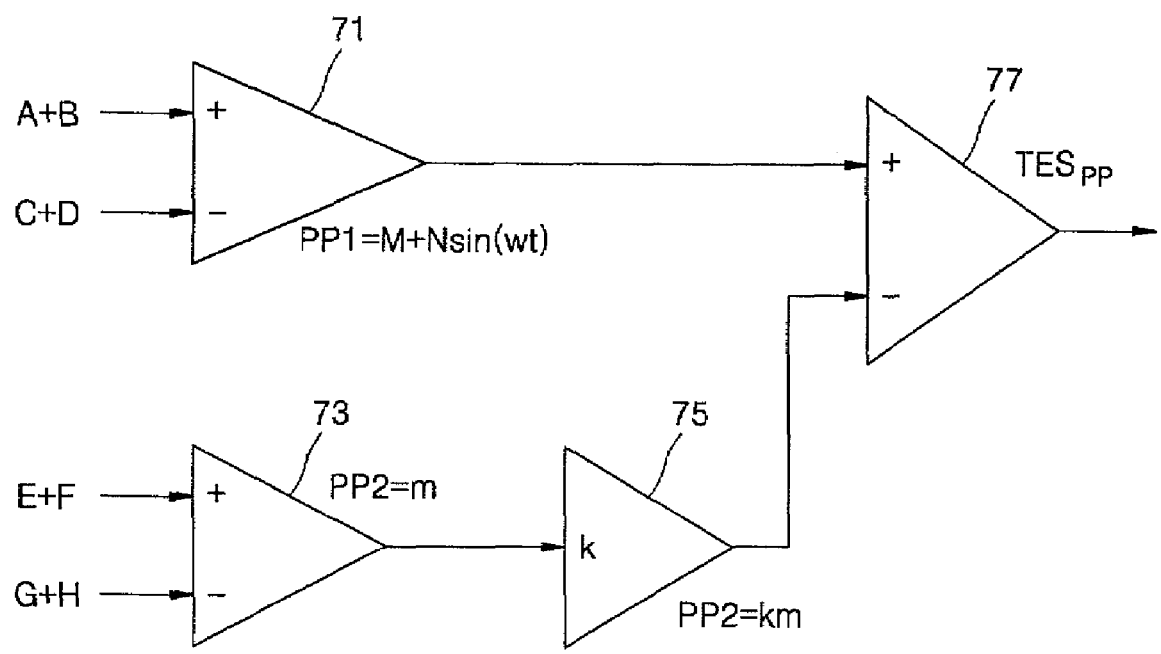
FIG. 8 is a block diagram showing an example of a signal processing unit to detect a tracking error signal by applying a push-pull method from part of the detected signal of the photodetector shown in FIG. 7.

As shown in FIG. 8, a signal processing unit 70 to detect a tracking error signal detected using a push-pull method includes first through third differentiators 71, 73, 77. The first differentiator 71 detects the first push-pull signal PP1 with respect to the detection signals A, B, C, and D of the singular light receiving regions 55a, 56a, 57a, and 58a of the second through fifth light receiving portions 55, 56, 57, and 58. The second differentiator 73 detects the second push-pull signal PP2 with respect to the detection signals E, F, G, and H of the four-divided light receiving regions of the first light receiving portion 53. The third differentiator 77 outputs a tracking error signal $TES_{PP}$ in a push-pull method by subtracting the first and second push-pull signals PP1 and PP2. The signal processing unit 70 further includes a gain adjuster 75 to amplify the second push-pull signal PP2 by a predetermined gain k to be input to the third differentiator 77.

Figure 9A:
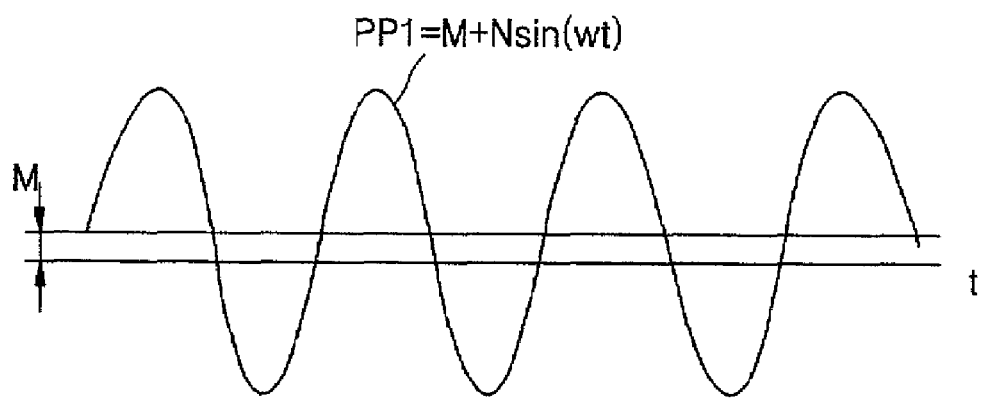
FIGS. 9A, 9B, and 9C are graphs for explaining the principle of the signal processing unit shown in FIG. 8 to detect a tracking error signal in which an offset is removed.
Figure 9B:
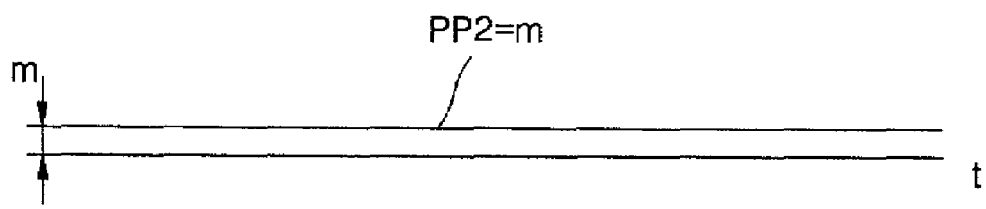
Figure 9C:
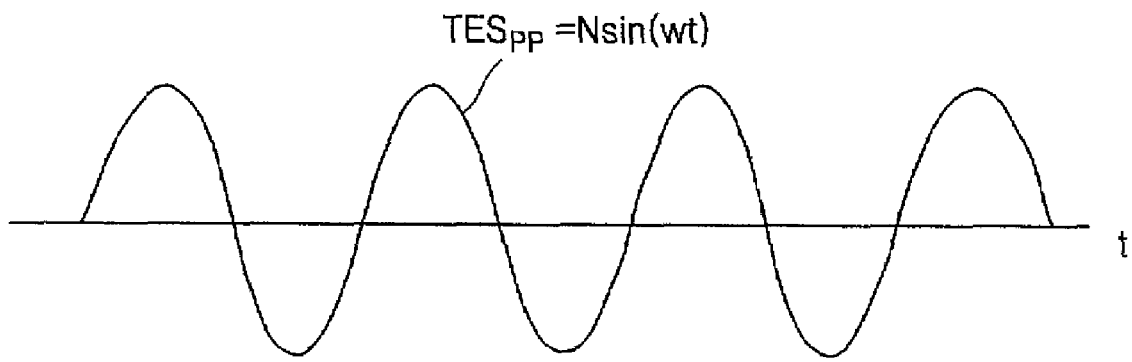

When the objective lens 40 is shifted, the position of the $-1^{st}$ order beam diffracted by the second through fifth diffraction regions A', B', C', and D' of the diffraction member 30 and received by the singular light receiving regions 55a, 56a, 57a, and 58a of the second through fifth light receiving portions 55, 56, 57, and 58 is shifted. Thus, a predetermined offset M is generated to the first push-pull signal PP1, as shown in FIG. 9A. Since the $+1^{st}$ beam diffracted by the first diffraction region E' of the diffraction member 30 and received by the four-divided light receiving regions of the first light receiving portion 53 is abeam magnified in the direction R, the second push-pull signal PP2 is not relatively sensitive to the movement of the objective lens 40. That is, the second push-pull signal PP2 is a DC signal having a size of about m. Thus, when a gain of the gain adjustor 75 satisfies the relationship that km-M=0, the third differentiator 77 outputs a tracking error signal ($TES_{PP}$) in the application of the push-pull method by which balance is maintained regardless of the shift of the objective lens 40, as shown in FIG. 9C. Thus, in the optical pickup apparatus according to the present invention, a tracking error signal is detected having a reduced offset due to a shift of the objective lens 40.

The tracking error signal detection in the application of the push-pull method can be used, for example, for recording of a DVD-R/DVD-RW and recording/reproduction of a DVD-RAM.

In the tracking error signal detection in the application of the phase difference detection method, when the first light beam 11a reflected by the optical disc 10 and incident on the diffraction member 30 is divided into four light regions by axes parallel to the direction R and the direction T, the tracking error signal can be detected by subtracting a phase of a sum signal of the detection signals A, C, E, and G of one pair of the light receiving regions of the first light receiving portion 53 with respect to light regions arranged along one diagonal direction and the singular light receiving regions 55a and 57a of the second and fourth light receiving portions 55 and 57, from a phase of a sum signal of the detection signals B, D, F, and H of the other pair of the light receiving regions of the first light receiving portion 53 with respect to light regions arranged along the other diagonal direction and the singular light receiving regions 56a and 58a of the third and fifth light receiving portions 56 and 58.

The tracking error signal detection in application of the phase detection method can be used, for example, for the reproduction of DVD-ROM and the reproduction of DVD-R/DVD-RW.

The focus error signal FES is detected as expressed in Equation 4. In Equation 4, the detection signals A1 and A2 are of the inner and outer light receiving regions of the two-divided light second light receiving region 55b, the detection signals B1 and B2 are of the inner and outer light receiving regions of the two-divided light receiving region 56b, the detection signals C1 and C2 are of the inner and outer light receiving regions of the two-divided light receiving region 57b, and the detection signals D1 and D2 are of the inner and outer light receiving regions of the two-divided light receiving region 58b.

$$FES=(A2+B1+C2+D1)-(A1+B2+C1+D2) \qquad \text{Equation 4}$$

Figure 10:
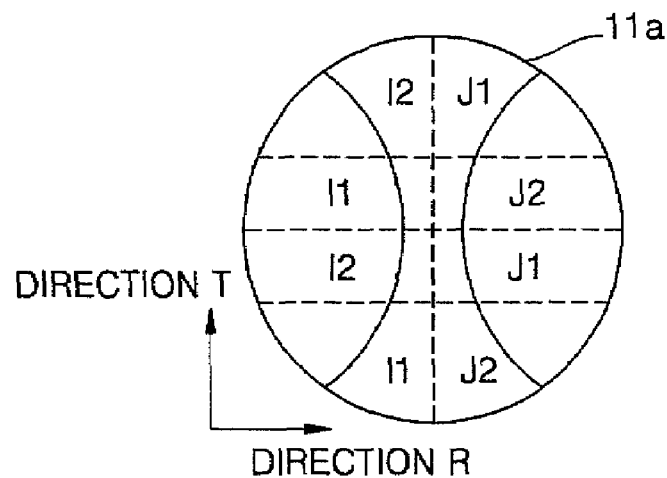
FIGS. 10, 11, and 12 are views showing the light region dividing structure to explain the principle of detecting a focus error signal, a tilt error signal ($S_{tilt}$), and a differential signal ($S_{diff}$) for the optimal focus control of a light spot according to Equations 4, 5, and 6, in the optical configuration of a diffraction member and a photodetector of an optical pickup apparatus according to an embodiment of the present invention.

As shown in FIG. 10, when the first light beam 11a is reflected by the optical disc 10 and divided into eight light regions I1, I2, J1, and J2, which are separated by dotted lines parallel to the direction R and the direction T, the focus error signal according to Equation 4 is substantially the same as (I1−I2)+(J1−J2). Since the light regions I1 and the light regions I2 are symmetrical in FIG. 10, the magnitude of the AC signals of the detection signal of the light region I1 and the detection signal of the light region I2 generated during track cross are the same. Thus, when the detection signals of the light regions I1 and I2 are subtracted, the AC signal components thereof are canceled. Likewise, the AC signal components of the detection signals of the light regions J1 and J2 are canceled. Thus, during the detection of the focus error signal FES according to Equation 4, even when a light spot formed on the optical disc 10 of a land/groove type such as a DVD-RAM crosses tracks in an on-focus state, the focus error signal is not affected by a groove. Also, the focus error signal FES detected according to Equation 4 is not sensitive to a deviation of the photodetector 50 and a change in the wavelength of the first light beam 11a by the characteristic of the optical structure of the optical pickup apparatus according to an embodiment of the present invention as described above.

A tilt error signal is detected by subtracting the phases of a sum signal of the detection signals E and H of the light regions arranged in the direction R of the optical disc 10, and a sum signal of the detection signals F and G of the remaining light regions thereof as shown in FIG. 7.

Figure 12:
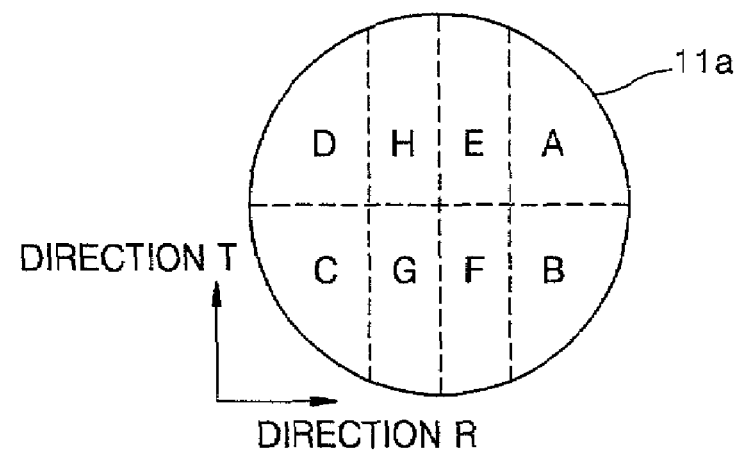

Alternatively, as shown in FIG. 12, the tilt error signal can be detected by subtracting the phases of a sum signal of the detection signals A and C of the singular light receiving regions 55a and 57a of the second and fourth light receiving portions 55 and 57 with respect to the light regions adjacent in a first diagonal direction and the detection signals F and H of the light regions of the first light receiving portion 53 with respect to the light region adjacent in a second diagonal direction crossing the first diagonal direction, and a sum signal of the detection signals B and D of the singular light receiving regions 56a and 58a with respect to the light regions adjacent in the second diagonal direction and the detection signals E and G of the light receiving regions of the first light receiving portion 53 with respect to light regions adjacent in the first diagonal direction. The detection of the tilt error signal according to the above method corresponds to a detection of the first light beam 11a by dividing the first light beam 11a reflected by the optical disc 10 into eight light regions, separated by dotted lines parallel to the direction R and direction T as shown in FIG. 12 and which will be described later.

The above tilt error signal detection in the application of the phase difference detection method can be used for the reproduction of the optical disc 10, for example, a DVD-ROM, in which pits are formed.

The tilt error signal $S_{tilt}$ can be detected by using the detection signals A1 and A2 of the inner and outer light receiving regions of the second two-divided light receiving portion 55b, the detection signals B1 and B2 of the inner and outer light receiving regions of the third two-divided light receiving portion 56b, the detection signals C1 and C2 of the inner and outer light receiving regions of the fourth light receiving portion 57b, and the detection signals D1 and D2 of the inner and outer light receiving regions of the fifth two-divided light receiving portion 58b, as expressed in Equation 5.

$$S_{tilt}=(A1+B1+C2+D2)-(A2+B2+C1+D1) \qquad \text{Equation 5}$$

Figure 11:
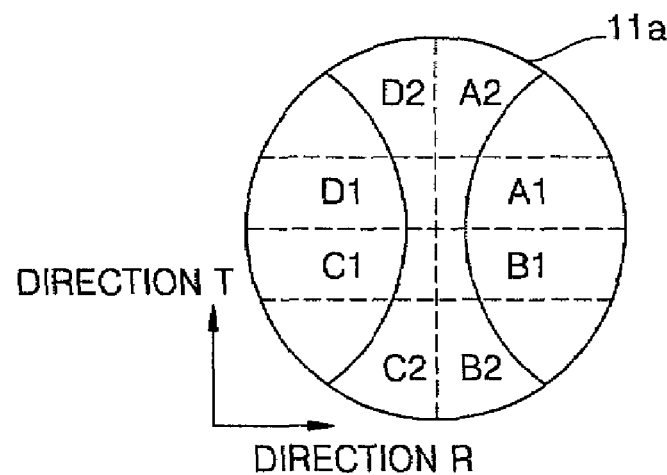

When the first light beam 11a reflected by the optical disc 10 is divided into eight light regions, which are separated by dotted lines parallel to the direction R and direction T as shown in FIG. 11, and a tilt is generated in a radial direction, the distribution of intensity of the light regions A1, B1, C2, and D2 increases while the distribution of intensity of the light regions A2, B2, C1, and D1 decreases. When a radial tilt is generated in the opposite direction, the distribution of intensity in the respective light regions is changed oppositely. For the convenience of understanding in FIG. 11, the eight light regions and the two-divided light receiving regions 55b, 56b, 57b, 58b of the second through fifth light receiving portions 55, 56, 57, and 58 to receive the light regions are indicated by the same reference letters.

Since the distribution of the intensity of the light regions A1, B1, C2, and D2 and that of the light regions A2, B2, C1, and D1 change to the opposite directions with respect to a radial tilt, a radial tilt error signal can be detected by subtracting the detection signals of the light regions as expressed in Equation 5.

The tilt error signal detection as shown in Equation 5 can be applied to the optical disc 10 having grooves formed therein, for example, a DVD-R, DVD-RW, or DVD-RAM.

The optimal focus control of a light spot can be performed by obtaining a differential signal $S_{diff}$ between a sum signal of the detection signals A, B, C, and D of the singular light receiving regions 55a, 56a, 57a, and 58a of the second through fifth light receiving portions 55, 56, 57, and 58 and a sum signal of the detection signals E, F, G, and H of the four-divided light receiving regions of the first light receiving portion 53, as expressed in Equation 6 below, and using the obtained differential signal $S_{diff}$. The detection of the differential signal $S_{diff}$ corresponds to a detection of the first light beam 11a by dividing the first light beam 11a reflected by the optical disc 10 into eight light regions, which are shown separated by dotted lines parallel to the direction R and direction T as shown in FIG. 12. For the sake of convenience, in FIG. 12, the eight light regions and the singular light receiving regions 55a, 56a, 57a, and 58a of the second through fifth light receiving portions 55, 56, 57, and 58, and the four-divided light receiving regions of the first light receiving portion 53 to detect the respective light regions are indicated by the same reference letters.

$$S_{diff}=(A+B+C+D)-(E+F+G+H) \qquad \text{Equation 6}$$

Figure 13:
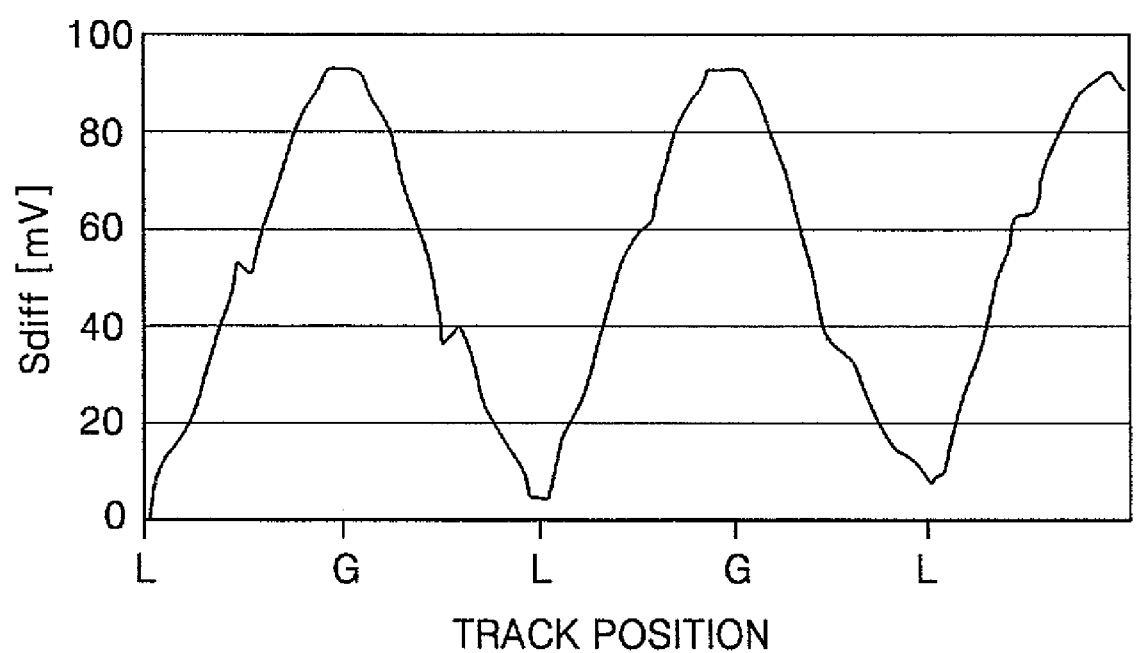
FIG. 13 is a graph showing the differential signal ($S_{diff}$) according to Equation 6.

FIG. 13 shows the on-focus state of the differential signal $S_{diff}$ detected by the above method. The differential signal $S_{diff}$ shown in FIG. 13 is a track cross signal with respect to the position of a track in the on-focus state. As can be seen from FIG. 13, the differential signal $S_{diff}$ is an oscillation signal in which the amount of oscillation increases as the defocus increases. Thus, the position where the amount of oscillation of the differential signal $S_{diff}$ is minimized is checked and the light spot is focused at the position. Thus, the light spot can trace an optimal focal point.

As can be seen from the above description, since the optical pickup apparatus having the above optical structure according to the present invention can optimally detect a tracking error signal, a focus error signal, a tilt error signal, and an optimal focus control signal by an appropriate method according to the type of the first optical disc 10a, an information signal can be stably recorded and reproduced by further comprising a signal processing portion 70 to detect at least one of the reproduction signal, the above-described error signals, and the optimal focus control signal and controlling tracking, focus and/or tilt servo using the detection signal.

Referring to FIGS. 3 through 5 and 7, the operation of the optical pickup apparatus according to a an embodiment of the present invention will be described. In an optical recording/reproduction apparatus having the optical pickup apparatus, the first optical disc 10a, for example, a DVD-ROM, DVD-R, DVD-RW, or DVD-RAM, is received. The first light source 11 is driven to emit the first light beam 11a. A predetermined linear polarization component, for example, a P polarization component, of the first light beam 11a is reflected by the first optical path changer 13 and is incident on the diffraction member 30 via the second optical path changer 17, the first collimating lens 15, and the mirror 19.

The first light beam 11a passes through the diffraction member 30, as is, and is focused by the objective lens 40 to be formed as a light spot on a recording surface of the first optical disc 10a. Here, the first light beam 11a incident on the diffraction member 30 sequentially passes through the aperture filter 37 and the polarization hologram layer 31, as is, and turns to an original circular polarization after passing through the polarization changing layer 33. The first light beam 11a reflected by the recording surface of the first optical disc 10a passes through the objective lens 40 and is incident on the diffraction member 30 again. The reflected first light beam 11a has a different circular polarization that is perpendicular to the original circular polarization due to being reflected by the recording surface of the first optical disc 10a. The first light beam 11a having a different circular polarization incident on the diffraction member 30 turns to a different linear polarization, for example, an S polarization, while passing through the polarization changing layer 33 and is diffracted by the polarization hologram layer 31. Thus, the first light beam 11a is divided into five-light regions and simultaneously is split into the $0^{th}$ order beam and $\pm 1^{st}$ order beams.

The split $0^{th}$ order and $-1^{st}$ order beams pass through the second optical path changer 17 to be incident on the first optical path changer 13 and then pass the first optical path changer 13 to be received by the photodetector 50. The signal processing unit 70 uses signals output from the photodetector 50 to detect a reproduction signal and/or a signal to control a focus, tracking and/or tilt servo according to the same principle as described above.

When the second optical disc 10b, for example, a CD-ROM, CD-R or CD-RW, is received by the optical recording/reproduction apparatus, the second light source 21 is driven to emit the second light beam 21a. The second light beam 21a passes through the hologram member 27 straightly and is incident on the diffraction member 30 via the second optical path changer 17. The phase of the second light beam 21a incident on the diffraction member 30 is compensated by the phase compensator 35 to have a reverse spherical aberration. The reverse spherical aberration cancels a spherical aberration caused by a difference in the thickness between the first optical disc 10a and the second optical disc 10b. However, it is understood that other mechanisms can be used to correct for the difference in thickness, such as using by exchanging the objective lens 40 with another objective lens (not shown) optimized for use with the second optical disc 10b. If one of these other mechanisms is used, the phase compensator 35 need not be used.

The aperture is limited by the aperture filter 37 so that an NA of, for example, 0.5 is achieved. The second light beam 21a passes through the polarization hologram layer 31, as is, and is focused by the objective lens 40 to form a light spot on the recording surface of the second optical disc 10b. The second light beam 21a is reflected by the recording surface of the second optical disc 10b and the reflected second light beam 21a is incident on the second optical path changer 17, and then on the hologram member 25 via the second optical path changer 17. The second light beam 21a is diffracted by the hologram member 25 and received by the photodetector 23.

As described above, the optical pickup apparatus according to an embodiment of the present invention is suitable for a compatible optical recording/reproduction apparatus for a DVD-RAM. The optical recording/reproduction apparatus using the optical pickup apparatus according to an embodiment of the present invention can compatibly use all types of DVD family optical discs and all types of CD family optical discs.

In the above description, the optical pickup apparatus according to the present invention has the optical structure shown in FIG. 3. In another embodiment, the optical pickup apparatus compatibly uses both DVD family and the next generation DVD family optical discs. In this embodiment, the first light source 11 emits a light beam of a blue wavelength suitable for the next generation DVD family optical discs, and the second light source 21 emits a light beam in a red wavelength range suitable for DVD family optical discs. The other optical devices constituting the optical pickup apparatus are optimized under the design conditions corresponding thereto. Here, when a diffraction member having the same function as that of the diffraction member 30 is further provided with respect to the second light beam 21a and a photodetector is formed to have the structure corresponding to the photodetector 50, a stable recording/reproduction is possible with respect to not only the next generation DVD family optical discs, but also the DVD family optical discs.

According to a further embodiment, the optical pickup apparatus uses optical discs of only one family. Here, in FIG. 3, the second light source 21, the other optical devices due to the second light source 2, and the second optical path changer 17 are removed, the front photodetector 18 is arranged at one side of the first optical path changer 13. Also, the wavelength of the light beam emitted from the first light source 11 and the other optical devices are formed under design conditions suitable for the format of the CD, DVD, or the next generation DVD family optical discs 10.

As described above, according to the optical structure of the present invention, a tracking error signal and a focus error signal that is not sensitive to a deviation of the photodetector can be detected. Even when the objective lens is shifted, a tracking error signal with reduced offset can be detected. Even when the wavelength of the light beam changes according to a change in the internal temperature of the optical recording/reproduction apparatus and a change of a recording/reproduction mode, a focus error signal with reduced offset can be detected. A focus error signal in which an effect by a groove is reduced can be detected with respect to land/groove type optical discs. A radial tilt can be detected with respect to an optical disc having a groove and an optical disc having a pit. A signal in which the size of oscillation increases or decreases according to defocus can be detected so that an optimal focal point of a light spot can be sought.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup apparatus comprising:
   a first light source to emit a first light beam having a first wavelength corresponding to a recording medium;
   a first optical path changer to change a proceeding path of the first light beam incident thereon towards the recording medium;
   an objective lens to receive from said first optical path changer and to focus the first light beam to form a light spot on a recording surface of the recording medium;
   a diffraction member to divide and diffract the first light beam reflected by the recording medium and having passed through said objective lens to be incident thereon, the reflected first light being divided into five light regions, said diffraction member comprising
     a first diffraction region being wider in a tangential direction corresponding to a tangential direction of the recording medium than in a radial direction corresponding to a radial direction of the recording medium, and
     second through fifth diffraction regions sequentially arranged in the tangential and radial directions such that adjacent ones of the second through fifth diffraction regions in the radial direction are separated by the first diffraction region; and
   a first photodetector having first through fifth light receiving portions to receive corresponding portions of the first light beam reflected by the recording medium and diffracted by the first through fifth diffraction regions of said diffraction member and having passed through said objective lens and said first optical path changer;
   wherein the first diffraction region generates $\pm 1^{st}$ order beams and includes an astigmatism generation pattern so that the $\pm 1^{st}$ order beams are magnified in the radial direction.

2. The optical pickup apparatus as claimed in claim 1, wherein each of the first through fifth diffraction regions has a corresponding pattern to diffract the incident first light beam to be split into $0^{th}$ order and $\pm 1^{st}$ order light beams and to separate the $+1^{st}$ order beams and/or the $-1^{st}$ order beams to be received by said first photodetector.

3. The optical pickup apparatus as claimed in claim 2, wherein the second through fifth diffraction regions have the corresponding patterns to make one of the ±1$^{st}$ order beams divergent as compared to the 0$^{th}$ order beam and the other of the ±1$^{st}$ order beams convergent as compared to the 0$^{th}$ order beam.

4. The optical pickup apparatus as claimed in claim 3, wherein the −1$^{st}$ order beam diffracted by the second and fourth diffraction regions and the +1$^{st}$ order beam diffracted by the third and fifth diffraction regions are focused at a first focal point, the +1$^{st}$ order beam diffracted by the second and fourth diffraction regions and the −1$^{st}$ order beam diffracted by the third and fifth diffraction regions are focused at a second focal point different from the first focal point, and said first photodetector is arranged between the first and second focal points in an on-focus state.

5. The optical pickup apparatus as claimed in claim 3, wherein:
  each of the second through fifth light receiving portions further includes two light regions divided in the tangential direction and receives a diffracted light beam of a remaining one of +1$^{st}$ and −1$^{st}$ order beams, and
  each pair of the two light regions of the corresponding second through fifth light receiving portions includes an inner light receiving region to receive a central portion of the first light beam and an outer light receiving region to receive an outer portion of the first light beam in a direction corresponding to the tangential direction.

6. The optical pickup apparatus as claimed in claim 2, wherein:
  each of the second through fifth light receiving portions further includes two light regions divided in the tangential direction and receives a diffracted light beam of a remaining one of +1$^{st}$ and −1$^{st}$ order beams, and
  each pair of the two light regions of the corresponding second through fifth light receiving portions includes an inner light receiving region to receive a central portion of the first light beam and an outer light receiving region to receive an outer portion of the first light beam in a direction corresponding to the tangential direction.

7. The optical pickup apparatus as claimed in claim 6, wherein:
  detection signals of the inner and outer light receiving regions of the second light receiving portion are A1 and A2,
  detection signals of the inner and outer light receiving regions of the third light receiving portion are B1 and B2,
  detection signals of the inner and outer light receiving regions of the fourth light receiving portion are C1 and C2, the fourth light receiving portion being adjacent the second light receiving portion in the tangential direction, and
  detection signals of the inner and outer light receiving regions of the fifth light receiving portion are D1 and D2, the fifth light receiving portion being adjacent the third light receiving portion in the tangential direction,
  the optical pickup apparatus further comprising a signal processing unit to detect a focus error signal FES is expressed in the following Equation, $FES=(A2+B1+C2+D1)-(A1+B2+C1+D2)$.

8. The optical pickup apparatus as claimed in claim 6, wherein:
  detection signals of the inner and outer light receiving regions of the second light receiving portion are A1 and A2,
  detection signals of the inner and outer light receiving regions of the third light receiving portion are B1 and B2,
  detection signals of the inner and outer light receiving regions of the fourth light receiving portion are C1 and C2, the fourth light receiving portion being adjacent the second light receiving portion in the tangential direction,
  and detection signals of the inner and outer light receiving regions of the fifth light receiving portion are D1 and D2, the fifth light receiving portion being adjacent the third light receiving portion in the tangential direction,
  the optical pickup apparatus further comprising a signal processing unit to detect a tilt error signal $S_{tilt}$ is expressed in the following Equation, $S_{tilt}=(A1+B1+C2+D2)-(A2+B2+C1+D1)$.

9. The optical pickup apparatus as claimed in claim 1, wherein the second through fifth diffraction regions generate 0$^{th}$ and ±1$^{st}$ order beams and make one of the 1$^{st}$ order beams divergent compared to the 0$^{th}$ order beam and the other of the ±1$^{st}$ order beams convergent compared to the 0$^{th}$ order beam.

10. The optical pickup apparatus as claimed in claim 9, wherein the −1$^{st}$ order beam diffracted by the second and fourth diffraction regions and the +1$^{st}$ order beam diffracted by the third and fifth diffraction regions are focused at a first focal point, the +1$^{st}$ order beam diffracted by the second and fourth diffraction regions and the −1$^{st}$ order beam diffracted by the third and fifth diffraction regions are focused at a second focal point different from the first focal point, and said first photodetector is arranged between the first and second focal points in an on-focus state.

11. The optical pickup apparatus as claimed in claim 1, wherein said first photodetector further comprises a main light receiving portion to receive and detect a 0$^{th}$ order beam that is not diffracted by the first through fifth diffraction regions.

12. The optical pickup apparatus as claimed in claim 1, wherein said diffraction member is arranged between said first optical path changer and said objective lens and comprises:
  a polarization hologram layer to transmit the first light beam without diffraction toward the recording medium from said first light source and to diffract the first light beam reflected by the recording medium, and
  a polarization changing layer formed at a side of the polarization hologram layer facing the recording medium to change a polarization of an incident light beam.

13. The optical pickup apparatus as claimed in claim 1, wherein:
  the first light receiving portion has four-divided light receiving regions divided in the radial direction and the tangential direction and that receive +1$^{st}$ order or −1$^{st}$ order beams diffracted by the first diffraction region, and
  the second through fifth light receiving portions include light receiving regions to receive +1$^{st}$ order or −1$^{st}$ order beams diffracted by the second through fifth diffraction regions.

14. The optical pickup apparatus as claimed in claim 13, wherein:
  detection signals of the light receiving regions of the second through fifth light receiving portions are A, B, C, and D, detection signals of the four-divided light receiving regions of the first light receiving portion are E, F, G, H, with the detection signals E and F being from ones of the four-divided light receiving regions adjacent in the tangential direction and the detection signals E and H being from ones of the four-divided light receiving regions adjacent in the radial direction, and when the first light beam incident on said diffraction member after being reflected by the recording medium is divided into four light regions along axes parallel to the radial direction and the tangential direction, the optical pickup apparatus further comprises a signal processing unit to detect a tracking error signal by a difference in phases of a sum signal of the detection signals E and G of the light regions adjacent in one diagonal direction and a sum signal of the detection signals F and H of the light regions adjacent in the other diagonal direction.

15. The optical pickup apparatus as claimed in claim 13, wherein:

detection signals of the four-divided light receiving regions of the first light receiving portion are E, F, G, and H, with the detection signals E and F being from ones of the four-divided light receiving regions adjacent in the tangential direction and the detection signals E and H being from ones of the four-divided light receiving regions adjacent in the radial direction, the optical pickup apparatus further comprising a signal processing unit to detect a tilt error signal by a difference in phases of a sum signal of the detection signals E and H of a pair of the light receiving regions arranged parallel to the radial direction and a sum signal of the detection signals F and G.

16. The optical pickup apparatus as claimed in claim 13, wherein:

detection signals of the light receiving regions of the second through fifth light receiving portions are A, B, C, and D, and detection signals of the four-divided light receiving regions of the first light receiving portion are E, F, G, H, with the detection signals E and F being from ones of the four-divided light receiving regions adjacent in the tangential direction and the detection signals E and H being from ones of the light regions adjacent in the radial direction, the optical pickup apparatus further comprising a signal processing unit to detect a tilt error signal by a difference in phases of a sum signal of the detection signals A and D of the light receiving regions of the second and fourth light receiving portions with respect to the light regions adjacent in a first diagonal direction and the detection signals F and H of the four-divided light regions of the first light receiving portion with respect to light regions adjacent in a second diagonal direction, and a sum signal of the detection signals B and D of the light receiving regions of the third and fifth light receiving portions with respect to light regions adjacent in the second diagonal direction and the detection signals E and G of the light receiving regions of the first light receiving portion with respect to light regions adjacent in the first diagonal direction.

17. The optical pickup apparatus as claimed in claim 13, wherein:

each of the second through fifth light receiving portions further includes two-divided light regions that receive a diffracted light beam of a remaining one of the +1$^{st}$ and −1$^{st}$ order beams, and each pair of the two-divided light regions corresponding to the second through fifth light receiving portions includes an inner light receiving region to receive a central portion of the first light beam and an outer light receiving region to receive an outer portion of the first light beam in the tangential direction.

18. The optical pickup apparatus as claimed in claim 17, wherein:

detection signals of the inner and outer light receiving regions of the second light receiving portion are A1 and A2, detection signals of the inner and outer light receiving regions of the third light receiving portion are B1 and B2, detection signals of the inner and outer light receiving regions of the fourth light receiving portion are C1 and C2, and detection signals of the inner and outer light receiving regions of the fifth light receiving portion are D1 and D2, the optical pickup apparatus further comprising a signal processing unit to detect a focus error signal FES as expressed in the following Equation, $FES=(A2+B1+C2+D1)-(A1+B2+C1+D2).$ 19. The optical pickup apparatus as claimed in claim 17, wherein:

detection signals of the inner and outer light receiving regions of the second light receiving portion are A1 and A2, detection signals of the inner and outer light receiving regions of the third light receiving portion are B1 and B2, detection signals of the inner and outer light receiving regions of the fourth light receiving portion are C1 and C2, and detection signals of the inner and outer light receiving regions of the fifth light receiving portion are D1 and D2, the optical pickup apparatus further comprising a signal processing unit to detect a tilt error signal $S_{tilt}$ as expressed in the following Equation, $S_{tilt}=(A1+B1+C2+D2)-(A2+B2+C1+D1).$ 20. The optical pickup apparatus as claimed in claim 13, wherein:

detection signals of the light receiving regions of the second through fifth light receiving portions are A, B, C, and D, and detection signals of the four-divided light receiving regions of the first light receiving portion are E, F, G, and H, with the detection signals E and F being from ones of the four-divided light receiving regions adjacent in the tangential direction and the detection signals E and H being from ones of the four-divided light receiving regions adjacent in the radial direction, the optical pickup apparatus further comprising a signal processing unit to detect a tracking error signal using a differential signal or a sum signal between a first push-pull signal with respect to the detection signals A, B, C, and D, and a second push-pull signal with respect to the detection signals E, F, G, and H.

21. The optical pickup apparatus as claimed in claim 20, wherein said signal processing unit amplifies the second push-pull signal by a predetermined gain and differentiates or sums the amplified second push-pull signal with respect to the first push-pull signal.

22. The optical pickup apparatus as claimed in claim 13, wherein:
    detection signals of the light receiving regions of the second through fifth light receiving portions are A, B, C, and D, and
    detection signals of the four-divided light receiving regions of the first light receiving portion are E, F, G, and H, with the detection signals E and F being from ones of the four-divided light receiving regions adjacent in the tangential direction and the detection signals E and H being from ones of the four-divided light receiving regions adjacent in the radial direction,
    the optical pickup apparatus further comprising a signal processing unit to adjust an optimal focus position of a light spot by a differential signal between a sum signal of the detection signals A, B, C, and D and a sum signal of the detection signals E, F, G, and H.

23. The optical pickup apparatus as claimed in claim 1, wherein:
    each of the second through fifth light receiving portions further includes two-divided light regions divided in the tangential direction and receives a diffracted light beam of a remaining one of $+1^{st}$ and $-1^{st}$ order beams, and
    each pair of the two-divided light regions of the corresponding second through fifth light receiving portions includes an inner light receiving region to receive a central portion of the first light beam and an outer light receiving region to receive an outer portion of the first light beam in a direction corresponding to the tangential direction.

24. The optical pickup apparatus as claimed in claim 23, wherein:
    detection signals of the inner and outer light receiving regions of the second light receiving portion are A1 and A2,
    detection signals of the inner and outer light receiving regions of the third light receiving portion are B1 and B2,
    detection signals of the inner and outer light receiving regions of the fourth light receiving portion are C1 and C2, and
    detection signals of the inner and outer light receiving regions of the fifth light receiving portion are D1 and D2,
    the optical pickup apparatus further comprising a signal processing unit to detect a focus error signal FES is expressed in the following Equation, $FES=(A2+B1+C2+D1)-(A1+B2+C1+D2)$.

25. The optical pickup apparatus as claimed in claim 23, wherein:
    detection signals of the inner and outer light receiving regions of the second light receiving portion are A1 and A2,
    detection signals of the inner and outer light receiving regions of the third light receiving portion are B1 and B2,
    detection signals of the inner and outer light receiving regions of the fourth light receiving portion are C1 and C2,
    and detection signals of the inner and outer light receiving regions of the fifth light receiving portion are D1 and D2,
    the optical pickup apparatus further comprising a signal processing unit to detect a tilt error signal $S_{tilt}$ is expressed in the following Equation, $S_{tilt}=(A1+B1+C2+D2)-(A2+B2+C1+D1)$.

26. An optical pickup apparatus comprising:
    a first light source to emit a first light beam having a first wavelength corresponding to a recording medium;
    a first optical path changer to change a proceeding path of the first light beam incident thereon towards the recording medium;
    an objective lens to receive from said first optical path changer and to focus the first light beam to form a light spot on a recording surface of the recording medium;
    a diffraction member to divide and diffract the first light beam reflected by the recording medium and having passed through said objective lens to be incident thereon, the reflected first light being divided into five light regions, said diffraction member comprising
        a first diffraction region being wider in a tangential direction corresponding to a tangential direction of the recording medium than in a radial direction corresponding to a radial direction of the recording medium, and
        second through fifth diffraction regions sequentially arranged in the tangential and radial directions such that adjacent ones of the second through fifth diffraction regions in the radial direction are separated by the first diffraction region;
    a first photodetector having first through fifth light receiving portions to receive corresponding portions of the first light beam reflected by the recording medium and diffracted by the first through fifth diffraction regions of said diffraction member and having passed through said objective lens and said first optical path changer; and
    a second light source to emit a second light beam having a second wavelength different from the first wavelength, and a second optical path changer to guide a proceeding path of the first and second light beams towards said objective lens, so that recording media in different formats are compatibly used in the optical pickup apparatus.

27. The optical pickup apparatus as claimed in claim 26, further comprising a second photodetector to receive the second light beam reflected by the recording medium, and a hologram member to selectively diffract an incident light beam between said second light source and said second optical path changer, where said second light source, said second photodetector, and said hologram member are incorporated into a single optical module.

28. The optical pickup apparatus as claimed in claim 26, further comprising a front photodetector to monitor an optical power of said first and/or second light sources, provided at one side of said second optical path changer.

29. The optical pickup apparatus as claimed in claim 26, wherein:
    one of said first and second light sources emits a light beam having a wavelength to record and/or reproduce with respect to a CD family recording medium, and
    the other of said first and second light sources emits a light beam having a wavelength to record and/or reproduce with respect to a DVD family recording medium.

30. The optical pickup apparatus as claimed in claim 29, further comprising an aperture filter disposed on an optical path between said second optical path changer and said objective lens, said aperture filter comprising an aperture of a predetermined diameter, and a pattern formed around the aperture to diffract the light beam emitted from the one of said first and second light sources and to transmit without diffracting the light beam emitted from the other of said first and second light sources.

31. The optical pickup apparatus as claimed in claim 29, further comprising a phase compensator, disposed on the optical path between said second optical path changer and said objective lens, to compensate for spherical aberration due to a thickness of the recording medium during the recording/reproduction of the recording medium, wherein the recording medium has a thickness different from a thickness for which said objective lens is optimized.

32. The optical pickup apparatus as claimed in claim 29, wherein said diffraction member, arranged between said first optical path changer and said objective lens, comprises:
a polarization hologram layer to transmit without diffraction the first light beam straight toward the recording medium from said first light source and to diffract the first light beam reflected by the recording medium, and
a polarization changing layer formed at a side of the polarization hologram layer opposite the recording medium to change a polarization of an incident light beam.

33. The optical pickup apparatus as claimed in claim 32, wherein said diffraction member is arranged between said second optical path changer and said objective lens and the polarization hologram layer of said diffraction member selectively diffracts the first light beam according to a state of the polarization thereof and transmits the second light beam without diffraction regardless of a state of the polarization thereof.

34. The optical pickup apparatus as claimed in claim 33, wherein said diffraction member further comprises:
an aperture filter having an aperture of a predetermined diameter and a pattern formed around the aperture so as to diffract the light beam emitted from the one of said first and second light sources and transmit without diffraction the light beam emitted from the other of said first and second light sources, and
a phase compensator to compensate for spherical aberration due to a thickness of the recording medium during the recording/reproduction of the recording medium, where the recording medium has a thickness different from a thickness for which said objective lens is optimized.

35. The optical pickup apparatus as claimed in claim 34, wherein the phase compensator is disposed at the aperture of the aperture filter.

36. The optical pickup apparatus as claimed in claim 26, further comprising an aperture filter disposed on an optical path between said second optical path changer and said objective lens, said aperture filter comprising an aperture of a predetermined diameter and a pattern formed around the aperture so as to diffract the light beam emitted from the one of said first and second light sources and transmit the light beam emitted from the other of said first and second light sources without diffraction.

37. The optical pickup apparatus as claimed in claim 26, further comprising a phase compensator disposed on the optical path between said second optical path changer and said objective lens to compensate for spherical aberration due to a thickness of the recording medium during the recording/reproduction of the recording medium, the recording medium having a thickness different from a thickness for which said objective lens is optimized.

38. The optical pickup apparatus as claimed in claim 26, wherein said diffraction member, arranged between said first optical path changer and said objective lens, comprises:
a polarization hologram layer to transmit the first light beam without diffraction toward the recording medium from said first light source and to diffract the first light beam reflected by the recording medium, and
a polarization changing layer formed at a side of the polarization hologram layer facing the recording medium to change a polarization of an incident light beam.

39. The optical pickup apparatus as claimed in claim 38, wherein said diffraction member is arranged between said second optical path changer and said objective lens, and the polarization hologram layer of said diffraction member is formed to selectively diffract the first light beam according to a status of the polarization thereof and transmit the second light beam regardless of a status the polarization thereof without diffraction.

40. The optical pickup apparatus as claimed in claim 39, wherein said diffraction member further comprises:
an aperture filter having an aperture of a predetermined diameter and a pattern formed around the aperture so as to diffract the light beam emitted from the one of said first and second light sources and to transmit the light beam emitted from the other of said first and second light sources without diffraction, and
a phase compensator to compensate for spherical aberration due to a thickness of a recording medium during the recording/reproduction of the recording medium, where the recording medium has a thickness different from a thickness to which said objective lens is optimized.

41. The optical pickup apparatus as claimed in claim 40, wherein the phase compensator is disposed at the aperture of the aperture filter.

42. The optical pickup apparatus as claimed in claim 26, wherein:
one of said first and second light sources emits a light beam having a wavelength to record and/or reproduce with respect to a first recording medium, and
the other of said first and second light sources emits a light beam having a wavelength to record and/or reproduce with respect to a second recording medium having a different reflectivity as a function of wavelength than the first recording medium.

43. An optical pickup apparatus comprising:
a light source to emit a light beam having a wavelength corresponding to a recording medium;
an objective lens to focus the light beam to form a light spot on a recording surface of the recording medium;
a diffraction member to divide and diffract the light beam reflected by the recording medium and having passed through said objective lens to be incident thereon, said diffraction member to divide the reflected light into five light regions, said diffraction member comprising
a first diffraction region,
second through fifth diffraction regions arranged in a tangential direction corresponding to a tangential direction of the recording medium and a radial direction of the recording medium,
wherein the first diffraction region is disposed between an adjacent pair of the second through fifth diffraction regions in the radial direction and the first diffraction region has a same width in the tangential direction as another adjacent pair of the second through fifth diffraction regions in the tangential direction; and a photodetector having first through fifth light receiving portions to receive corresponding portions of the light beam reflected by the recording medium and diffracted by the first through fifth diffraction regions of said diffraction member and having passed through said objective lens.

44. The optical pickup apparatus as claimed in claim 43, further comprising a second lens disposed between said photodetector and diffraction member, wherein:
said second lens focuses a $-1^{st}$ order beam diffracted by the second and fourth diffraction regions and a $+1^{st}$ order beam diffracted by the third and fifth diffraction regions at a first focal point,
said second lens focuses a $+1^{st}$ order beam diffracted by the second and fourth diffraction regions and a $-1^{st}$ order beam diffracted by the third and fifth diffraction regions at a second focal point different from the first focal point, and
said photodetector is arranged between the first and second focal points in an on-focus state.

45. The optical pickup apparatus as claimed in claim 43, wherein:
the first diffraction region generates $\pm 1^{st}$ order beams and comprises an astigmatism generation pattern, and
the astigmatism generation pattern magnifies the $\pm 1^{st}$ order beams in the radial direction.

46. The optical pickup apparatus as claimed in claim 43, wherein first photodetector further comprises a main light receiving portion to receive and detect a $0^{th}$ order beam that is not diffracted by the first through fifth diffraction regions.

* * * * *

UNITED STATES PATENT AND TRADEMARK OFFICE
CERTIFICATE OF CORRECTION

PATENT NO. : 7,280,458 B2 Page 1 of 1
APPLICATION NO. : 10/120786
DATED : October 9, 2007
INVENTOR(S) : Yong-jae Lee et al.

It is certified that error appears in the above-identified patent and that said Letters Patent is hereby corrected as shown below:

Column 20, Line 20, change "1st" to --±1st--.

Column 20, Line 67, after "D," insert --and--.

Column 25, Line 22, after "lens" insert --,--.

Signed and Sealed this

Twenty-ninth Day of April, 2008

JON W. DUDAS
*Director of the United States Patent and Trademark Office*